Aug. 2, 1966 W. P. MORROW 3,263,483
METHOD OF ADJUSTING END PLAY IN V BEARINGS
OF CLOCKS, WATCHES AND INSTRUMENTS
Filed June 18, 1964

INVENTOR,
WARREN. P. MORROW

BY: Harry M. Saragovitz,
Edward J. Kelly, Herbert Berl &
J. P. Edgerton

United States Patent Office 3,263,483
Patented August 2, 1966

3,263,483
METHOD OF ADJUSTING END PLAY IN V BEARINGS OF CLOCKS, WATCHES AND INSTRUMENTS
Warren P. Morrow, Wheaton, Md., assignor to the United States of America as represented by the Secretary of the Army
Filed June 18, 1964, Ser. No. 376,278
3 Claims. (Cl. 73—9)

The invention described herein may be manufactured and used by or for the Government of the United States of America for governmental purposes without the payment to me of any royalty thereon.

The present invention relates to a method of adjusting precision instruments and more particularly to a method of adjusting the end play in V bearing of clocks, watches and deflection instruments such as, for example, galvanometers and the like.

In the field of clock, watch and precision instrument manufacture, it has been the general practice to adjust the end play in V bearings by hand relying only on observation of the movement of the pivot assembly in the V bearings as a guide to the proper adjustment. This critical adjustment requires the skill of an experienced watch maker or skilled craftsman. Even when the bearings are adjusted by such an expert, the end play is greater than it needs to be. This excessive end play permits damage to the conical pivot and V bearing due to vibration and shock. If the bearings are tightened to reduce the end play, there is great likelihood that the bearings will be damaged. At best, attempts to reduce the end play will result in excessive friction and wear to the bearings. Excessive end play also requires greater lateral tolerances for the pivot assembly because the assembly tends to nutate due to a rolling motion of the conical pivot in the V bearing. These tolerances are critical in miniaturized equipment. It has been found that it is difficult and often impossible for an expert to adjust the end play to tolerances required for highly sensitive instruments. For this reason, ribbon suspensions have been used for such instruments. These suspensions, which rely on the torsion of a fiber, are expensive and result in large and bulky instruments. Where adjustment by a skilled expert is otherwise adequate for the intended purpose of the instrument, the precision of the adjustment is always poor resulting in inconsistent life spans for similar instruments. This is of great significance in reliability studies.

It is therefore an object of this invention to provide a method of adjusting the end play in V bearings of precision instruments to tolerances which are better than an order of magnitude smaller than those that could heretofore be achieved only by a person of great skill and experience that may be routinely practiced by any laboratory technician after only a few minutes of practice.

It is another object of the present invention to provide a method of adjusting the end play in V bearings of precision instruments that will eliminate excessive friction and wear to the bearings and promote longer and more consistent life spans for instruments so adjusted.

It is still another object of the instant invention to provide a method of adjusting the end play in V bearings of precision instruments that results in a reduction of lateral tolerances of the pivot assembly and an increase in the resistance to damage to the instrument due to vibration and shock.

It is yet another object of the invention to provide a method of adjusting the end play in V bearings of precision instruments that increases the sensitivity of instruments so adjusted thereby eliminating the need for more bulky and expensive suspension systems.

According to the present invention, the foregoing and other objects are attained by attaching a small magnet to a point on the pivot assembly such as, for example, the balance wheel in a clock, then causing the pivot assembly to oscillate, monitoring on an oscilloscope the voltage induced in a pickup coil by the oscillating magnet, decreasing the end play in the bearings until the oscilloscope trace is similar to a first predetermined trace, and then increasing the end play in the bearings until the oscilloscope trace is similar to a second predetermined trace.

The specific nature of the invention, as well as other objects, aspects, uses and advantages thereof, will clearly appear from the following description and from the accompanying drawings, in which.

Figure 1:
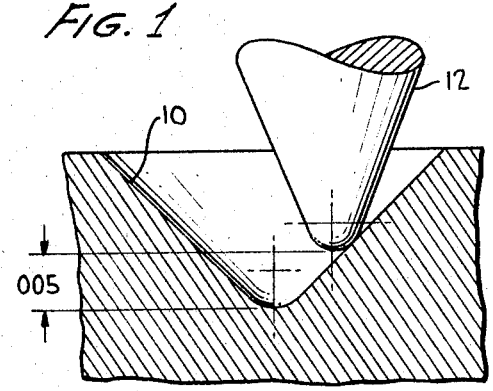
FIG. 1 is a sectional view of a conical pivot in a V bearing after adjustment by prior art methods.
Figure 2:
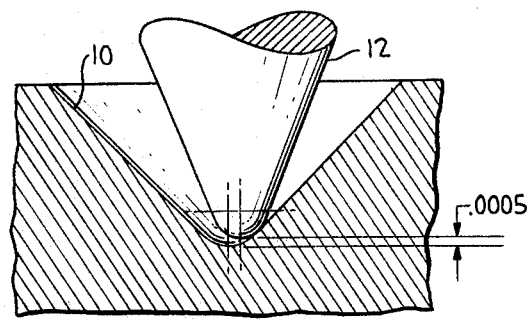
FIG. 2 is a sectional view of a conical pivot in a V bearing after adjustment by the method according to the present invention.

Referring now to the drawings wherein like reference numerals designate identical parts throughout the several views and more particularly to FIG. 1 wherein the conical pivot 12 is shown in the V bearing 10 after adjustment by prior art methods. As may be seen, the end play on this assembly is on the order of five mils. FIG. 2 shows the same pivot and bearing after adjustment by the method according to the invention. Here, the end play has been reduced to about one half a mil or less.

Figure 3:
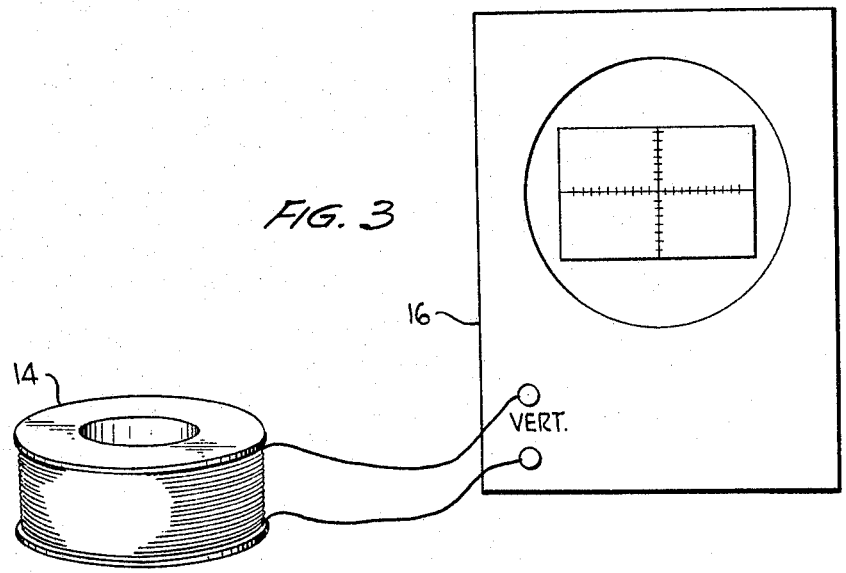
FIG. 3 is a view of the apparatus used in practicing the invention.

In order to accomplish this result, the apparatus shown in FIG. 3 is employed. This includes a pickup coil 14 which is preferably 31,700 turns of No. 36TF copper wire wound on a plastic coil form 1½" inside diameter by 4" outside diameter and 1½" thick. The pickup coil is connected to the vertical input terminals of an oscilloscope 16.

Figure 4:
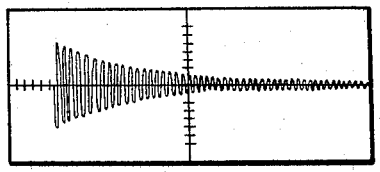
FIGS. 4, 5 and 6 are oscillographs used in practicing the invention.
Figure 5:
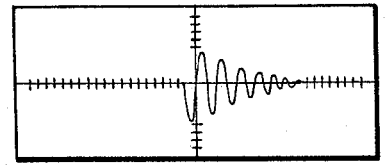
Figure 6:
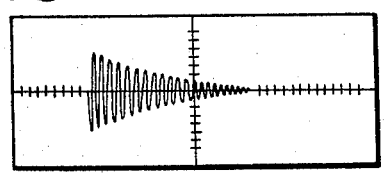

Adjustment is performed by the following steps. First, a small magnet is attached to the pivot assembly of the instrument to be adjusted. If the instrument is a clock, the magnet is attached to the balance wheel. In any event the magnet is attached at a point on the pivot assembly that will oscillate around the center of the pivot when the pivot assembly is caused to oscillate. The magnet may be attached with a small piece of tape which has adhesive on both sides. The tape allows easy attachment of the magnet for the adjustment and removal of the magnet after the adjustment. The bearing and pivot assembly are then placed as near as possible to the center of the pickup coil. This may be facilitated by placing a small plastic disc over the center of the coil to provide a platform for the assembly. The pivot assembly is then caused to oscillate by deflecting the assembly to a maximum position and releasing. The voltage induced in the pickup coil by the oscillating magnet is displayed on the oscilloscope screen which provides a monitor for the motion of the pivot assembly. FIG. 4 shows an oscillograph of the oscilloscope trace prior to adjusting the end play in the bearings. This waveform shows extreme freedom of motion, which is due to a combination rolling and rotational or sliding motion. With a relatively large amount of end play the pivot has a large radius in which to roll. At this point end play of between one to twenty mils is allowable. It is merely necessary that the pivots be free of binding. The bearings are gradually tightened to a point where slightly excessive friction is noted by the oscilloscope trace. This condition is shown by the oscillograph of FIG. 5. Under this condition the end play has been reduced to a point where little rolling can occur, and substantially all the motion of the pivot assembly will be rotational motion about the pivot axis. The end play is then increased in increments of one-tenth of a mil until the oscilloscope trace is similar to the oscillograph shown in FIG. 6. This will be the point at which the oscilloscope trace lengthens. When the end play of the V bearings have been so adjusted, the optimum condition between allowable friction and an end play allowance that permits proper sensor action and minimizes pivot and bearing damage due to vibration and shock will have been achieved. With a little practice, this procedure becomes routine.

Obviously, many modifications and variations of the present invention are possible in the light of the above teachings. It is therefore to be understood, that within the scope of the appended claims, the invention may be practiced otherwise than as specifically described.

I claim as my invention:

1. An improved method of adjusting the end play in V bearings in precision instruments comprising the steps of:
    (a) electrically monitoring and providing a display of the motion of the pivot assembly in the bearings to be adjusted,
    (b) decreasing the end play in the bearings until excessive friction is noted in the display, and
    (c) increasing the end play in the bearings until optimum end play is achieved as shown by the display.

2. A method of adjusting the end play in V bearings in precision instruments comprising the steps of:
    (a) electrically sensing the motion of the pivot assembly in the bearings to be adjusted,
    (b) displaying the motion so sensed as a trace on an oscilloscope,
    (c) decreasing the end play in the bearings until the oscilloscope trace is similar to a first predetermined trace, and
    (d) then increasing the end play in the bearings until the oscilloscope trace is similar to a second predetermined trace.

3. A method of adjusting the end play in V bearings in a precision instrument comprising the steps of:
    (a) attaching a small magnet to a point on the pivot assembly of the instrument which is off the pivot axis,
    (b) causing the pivot assembly to oscillate,
    (c) monitoring on an oscilloscope the voltage induced in a pickup coil by the oscillating magnet,
    (d) decreasing the end play in the bearings until the oscilloscope trace is similar to a first predetermined trace, and
    (e) then increasing the end play in the bearings until the oscilloscope trace is similar to a second predetermined trace.

References Cited by the Examiner

UNITED STATES PATENTS

| | | | |
|---|---|---|---|
| 982,635 | 1/1911 | Rogers et al. | 33—203.1 |
| 2,906,116 | 9/1959 | Musser | 73—9 X |

DAVID SCHONBERG, *Primary Examiner.*